(12) United States Patent
Cho

(10) Patent No.: US 12,594,679 B2
(45) Date of Patent: Apr. 7, 2026

(54) GRIPPER DEVICE USING AIR-TUBE

(71) Applicant: VTEC CO., LTD., Busan (KR)

(72) Inventor: Ho-Young Cho, Seoul (KR)

(73) Assignee: VTEC CO., LTD., Busan (KR)

( * ) Notice: Subject to any disclaimer, the term of this patent is extended or adjusted under 35 U.S.C. 154(b) by 876 days.

(21) Appl. No.: 17/906,333

(22) PCT Filed: May 25, 2022

(86) PCT No.: PCT/KR2022/007450
§ 371 (c)(1),
(2) Date: Sep. 14, 2022

(87) PCT Pub. No.: WO2023/075054
PCT Pub. Date: May 4, 2023

(65) Prior Publication Data
US 2023/0286172 A1 Sep. 14, 2023

(30) Foreign Application Priority Data

Oct. 26, 2021 (KR) ........................ 10-2021-0143167

(51) Int. Cl.
*B25J 15/06* (2006.01)
*B65B 21/12* (2006.01)
*B65G 47/90* (2006.01)

(52) U.S. Cl.
CPC ........... *B25J 15/0683* (2013.01); *B65B 21/12* (2013.01); *B65G 47/908* (2013.01)

(58) Field of Classification Search
CPC ......................... B25J 15/0683; B25J 15/0632; B25J 15/0633; B65G 47/908; B65B 21/12; B66C 1/46

USPC .......................................... 294/183, 186, 189
See application file for complete search history.

(56) References Cited

U.S. PATENT DOCUMENTS

| | | | | |
|---|---|---|---|---|
| 2,873,996 A | * | 2/1959 | Mchugh, Jr. ............ | B65B 21/12 |
| | | | | 294/93 |
| 3,086,805 A | * | 4/1963 | Dardaine .................. | B66C 1/62 |
| | | | | 294/90 |
| 3,831,995 A | * | 8/1974 | Duncan ................ | B65G 47/908 |
| | | | | 294/119.3 |

(Continued)

FOREIGN PATENT DOCUMENTS

| | | | |
|---|---|---|---|
| EP | 3640150 | * | 4/2020 |
| KR | 101502791 B1 | | 3/2015 |

(Continued)

*Primary Examiner* — Paul T Chin
(74) *Attorney, Agent, or Firm* — INNOVATION CAPITAL LAW GROUP, LLP; Vic Lin

(57) ABSTRACT

The present invention discloses a gripper device using an air-tube. Particularly, the gripper device quickly performs 'release' on gripping of a product. The gripper device is designed so that compressed air for griping, which is introduced through a first tube and accumulated in an expansion space of a side wall of the cylindrical air-tube, is instantly discharged to the outside through a second tube that is opened by a reverse movement of a valve and the air-tube. Thus, the 'release' is quickly performed to resultantly extremely reduce an operation time of a transfer operation in which gripping, transferring, releasing, and returning of the product are repeated.

8 Claims, 4 Drawing Sheets

(56)                    References Cited

U.S. PATENT DOCUMENTS

| | | | | |
|---|---|---|---|---|
| 3,856,343 | A | * | 12/1974 | Muller .................... B65B 21/12 |
| | | | | 294/90 |
| 3,885,825 | A | | 5/1975 | Amberg et al. |
| 4,022,363 | A | | 5/1977 | Eliassen |
| 4,379,578 | A | | 4/1983 | Schuler |
| 4,768,403 | A | | 9/1988 | Bar-Noy |
| 4,941,699 | A | | 7/1990 | Wilfong |
| 5,029,925 | A | * | 7/1991 | Rietzler .............. B65G 47/908 |
| | | | | 294/196 |
| 5,083,824 | A | * | 1/1992 | Sato ..................... B65G 47/908 |
| | | | | 294/119.3 |
| 7,287,792 | B2 | | 10/2007 | Tye |
| 8,172,290 | B2 | | 5/2012 | Nishino et al. |
| 2013/0059425 | A1 | * | 3/2013 | Zhang .................... H10D 84/00 |
| | | | | 257/E21.003 |
| 2023/0249363 | A1 | * | 8/2023 | Saitoh ................. B25J 15/0683 |
| | | | | 294/183 |

FOREIGN PATENT DOCUMENTS

| | | | |
|---|---|---|---|
| KR | 101906474 | B1 | 10/2018 |
| KR | 20200010923 | A | 1/2020 |
| WO | 2008093548 | A1 | 8/2008 |
| WO | 2014156562 | A1 | 10/2014 |

* cited by examiner

[Fig. 1]
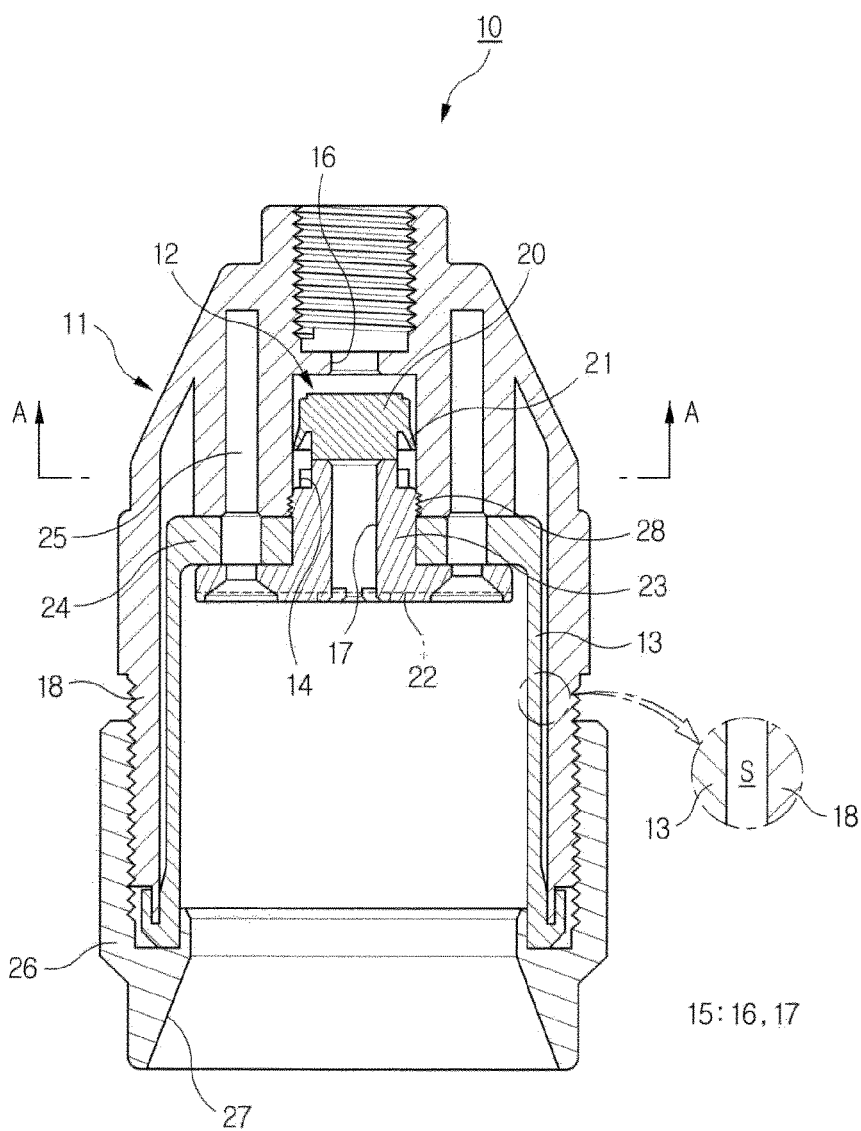
15 : 16 , 17
[Fig. 2]
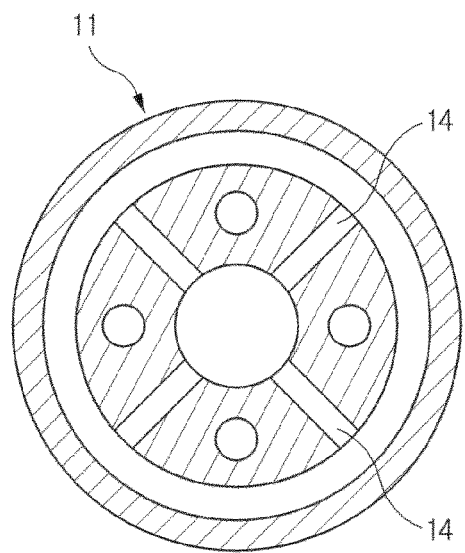

[Fig. 3]
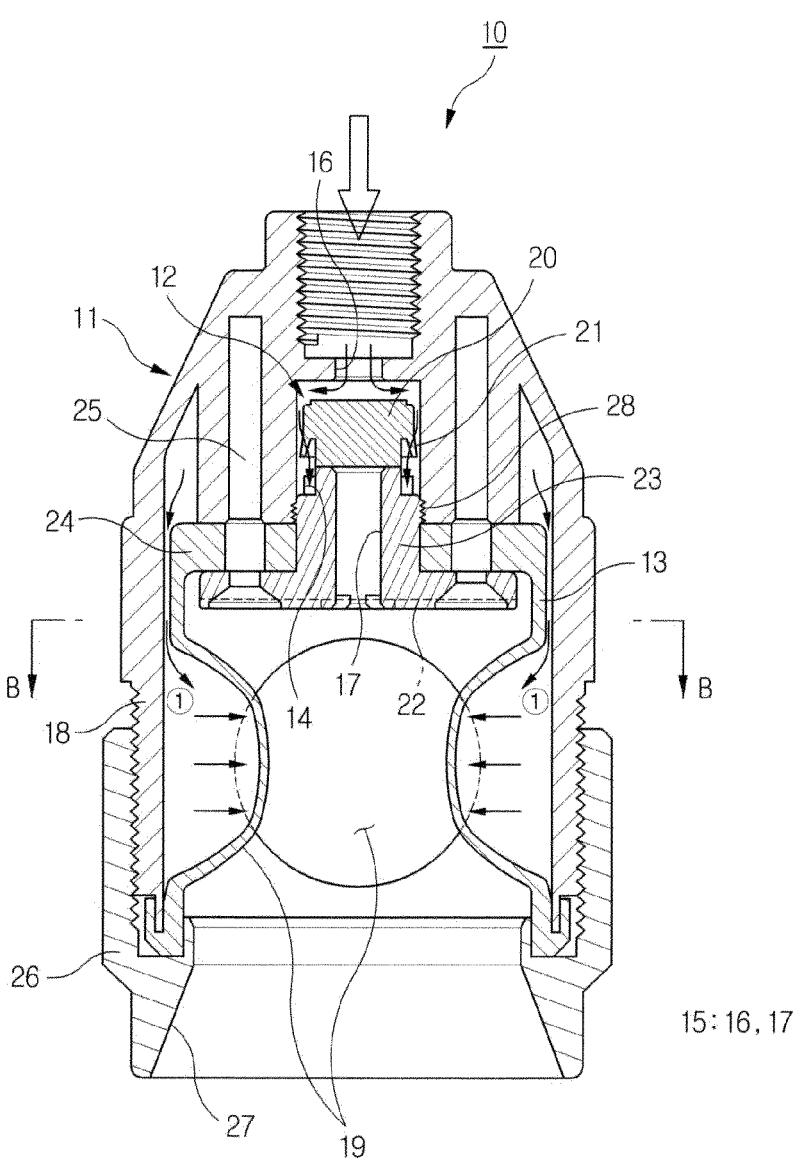
15 : 16, 17

[Fig. 4]
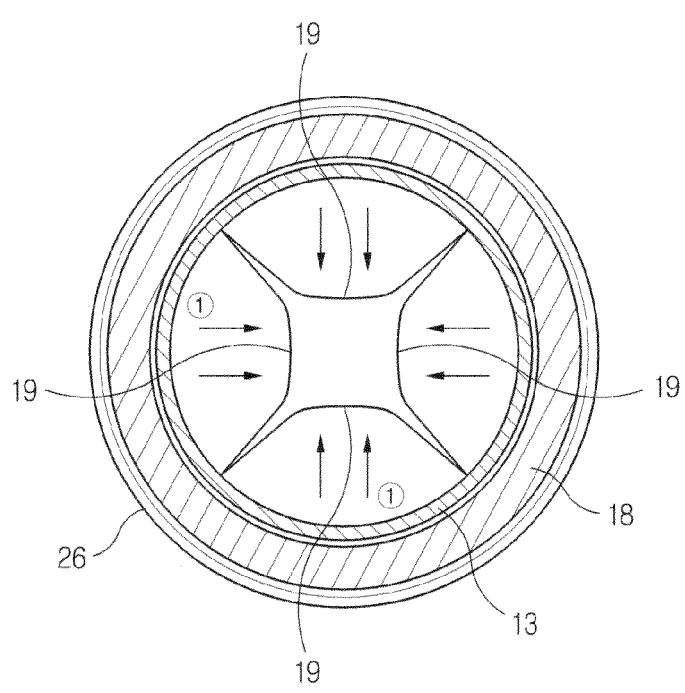

[Fig. 5]
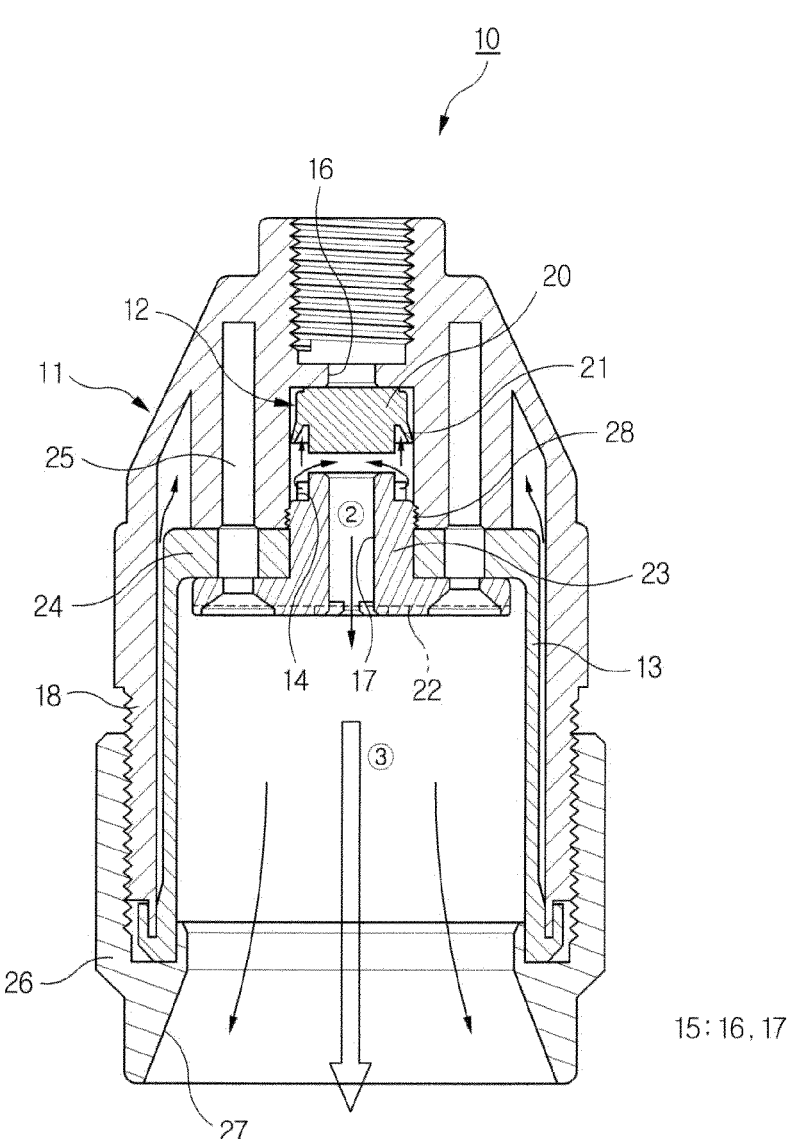
15 : 16, 17

GRIPPER DEVICE USING AIR-TUBE

TECHNICAL FIELD

The present invention relates to a gripper device used to grip a product to be transferred, and more particularly, to a gripper device using expansion pressure of an air-tube to grip a product to be transferred.

BACKGROUND ART

A so-called gripper device capable of gripping a product is required to perform fixing, transferring, packing, boxing, or other operations of the product in an automation process. The gripper device may have different structures according to the kinds and shapes of the corresponding product. Although the present invention is not limited to the kinds of the product, the present invention provides a gripper device that is optimally applicable to, particularly, a product having a bottle shape.

Related art documents 1 and 2 disclose a gripper device including a pair of left-right symmetric gripping pieces that organically operate to surround a neck of a bottle, and a related art document 3 discloses a vacuum gripper device surrounds an entire head of a bottle to enable negative pressure gripping.

However, since the above-described gripper devices have complex and inconvenient structures and installation apart from usefulness thereof, the gripper devices are practically impossible to be applied in a substantial site. For reference, related art documents 4 and 5, which disclose gripper devices using a suction pad, are not related to a technology of the present patent.

In recent years, a gripper device using an 'air-tube' is disclosed. The gripper device injects compressed air into the air-tube through an injection hole of a solenoid valve to generate expansion pressure, thereby gripping a head of a bottle.

Since the above-described gripper device has a simple and safe structure, installation, and usage for 'gripping', the gripper device has a significant advantage over the devices disclosed in the related art documents. However, since the compressed air injected into the tube is returned in a reverse direction and discharged through a discharge hole of the solenoid valve in case of release of the gripping, the release is performed with a low speed. As a result, an operation in which gripping, transferring, releasing, and returning processes are repeated has a long operation time.

TECHNICAL DOCUMENTS OF RELATED ART

1. WO 2008/093548
2. WO 2014/156562
3. Korean Patent Publication No. 10-2020-0010923
4. Korean Patent Publication No. 10-1502791
5. Korean Patent Publication No. 10-1906474

DISCLOSURE OF THE INVENTION

Technical Problem

The present invention is intended to solve the above-described limitations of the related arts. The present invention provides a gripper device based on a structure of gripping a product using an air-tube and particularly capable of quickly performing a product transfer operation with a fast release speed of gripping.

Technical Solution

According to the present invention, a gripper device includes:

a gripper housing including a supply tube including a first tube and a second tube, each of which extends in a vertical direction, and a cover part extending downward from an outer side of the supply tube;

a valve disposed between the first tube and the second tube in the supply tube to move upward or downwards based on a pressure direction of compressed air, thereby closing the first tube or the second tube;

an air-tube, as a cylindrical member spaced apart form an inner wall of the cover part with a space therebetween, which communicates with the second tube and in which a plurality of grip expansion portions are formed on a side wall of the air-tube; and a flow path defined at one side of the supply tube to connect the first tube and the space or the space and the second tube based on a movement direction of the valve.

In case of 'gripping' of a product, when compressed air is supplied through the first tube, the valve may descend by pressure of the introduced air to close the second tube, and the compressed air may be supplied to the space between the cover part and the air-tube through the flow path to press the grip expansion portion, thereby allowing the grip expansion portion to expand.

In case of 'release' of a product, when supply of compressed air through the first tube is stopped, the compressed air accumulated in the space may flow in a reverse direction, the valve may ascend by pressure of the discharged air to close the first tube, and the compressed air may be supplied to the second tube through the flow path and consecutively discharged to the outside through the air-tube, thereby allowing the grip expansion portion to contract.

Preferably, the valve may be a check valve including a skirt disposed at a side portion of a body and moving by pressure of the compressed air to contact or separated from a side wall of the supply tube, and the skirt may be 'separated' from the side wall of the supply tube to open an air path between the first tube and the space in case of 'gripping' and contact the side wall of the supply tube to close the air path in case of 'release', thereby allowing the valve to ascend.

According to an embodiment, the first tube may be integrated with a central portion of the housing, the second tube may be disposed on a separate fixing bar, and the fixing bar may be coupled to a lower portion of a body of the first tube. Here, the air-tube may be installed by using the fixing bar. For example, in a state in which an upper flange is inserted between the fixing bar and the first tube, the air-tube may be fixed by compression caused by coupling between a lower end of the body of the first tube and an upper end of the fixing bar through a coupling part or by a bolt that sequentially passes trough the fixing bar—the flange—the body of the first tube.

An end-lock that supports a lower end of the air-tube may be coupled to a lower portion of the cover part, and an inner end of the end-lock may have a downward-expansion type inclined surface.

Advantageous Effects

The gripper device according to the present invention is based on the structure of gripping the product by using the air-tube that operates by the compressed air and particularly quickly discharges the compressed air to have the fast release speed of the gripping. As a result, the operation time of the transfer operation in which the gripping, the transferring, the releasing, and the returning of the product are repeated may be extremely reduced.

BRIEF DESCRIPTION OF THE DRAWINGS

FIG. 1 is a cross-sectional view of a gripper device according to the present invention.

FIG. 2 is a cross-sectional view taken along line A-A of FIG. 1 and illustrating a housing.

FIG. 3 is a cross-sectional view for explaining a 'gripping' operation in FIG. 1.

FIG. 4 is a cross-sectional view taken along line B-B of FIG. 3.

FIG. 5 is a cross-sectional view for explaining a 'release' operation in FIG. 3.

DESCRIPTION OF REFERENCE NUMERALS

10. Gripper device
11. Housing
12. Valve
13. Air-tube
14. Flow path
15. Supply tube
16. First tube
17. Second tube
18. Cover part
19. Expansion portion
20. Body
21. Skirt
22. Passage
23. Fixing bar
24. Flange
25. Bolt
26. End-lock
27. Inclined surface
28. Coupling part
S. Space

MODE FOR CARRYING OUT THE INVENTION

Characteristics and effects of a 'gripper device using an air-tube' (hereinafter, referred to as a gripper device) according to the present invention, which are described or not described above, will be further clarified through embodiments described below with reference to the accompanying drawings. Hereinafter, the gripper device according to the present invention is indicated by reference number 10.

Referring to FIGS. 1 and 2, a gripper device 10 according to the present invention includes a gripper housing 11, a valve 12, an air-tube 13, and a flow path 14, which are organically designed.

Specifically, the gripper housing 11 includes a supply tube 15 including a first tube 16 and a second tube 17, each of which extends in a vertical direction, and a cover part 18 extending downward from an outer side of the supply tube 15. Also, the valve 12 is disposed between the first tube 16 and the second tube 17 in the supply tube 15 and moves upward or downwards based on a pressure direction of compressed air to close the first tube 16 or the second tube 17.

The air-tube, as a cylindrical member spaced apart from an inner wall of the cover part 18 with a predetermined space S therebetween, is a urethane tube having a hollow communicating with the second tube 17 and including a plurality of grip expansion portions 19 formed on a side wall thereof and each expanding toward the hollow. The flow path 14, as a passage that is radially formed toward one side or a surrounding of the supply tube 15, connects the first tube 16 and the space S or the space and the second tube 17 based on a movement direction of the valve 12.

Referring to FIGS. 3 and 4, in case of 'gripping' of a product, when the compressed air is supplied through the first tube 16, the valve 12 descends by pressure of the introduced air to close an end of the second tube 17, and then the compressed air is supplied to the space S between the cover part 18 and the air-tube 13 through the flow path 14 to press an outer side surface of the grip expansion portion 19, thereby allowing the grip expansion portion 19 to extend toward a central side (refer to arrow ①). By using this expansion pressure, the gripper device 10 may grip a product inserted inside the air-tube, e.g., a head of a bottle.

When the gripped product is transferred to a target place in an automation process, the gripping of the product is released, and the gripper device 10 is returned to an original position.

Referring to FIG. 5, when the supplying of the compressed air through the first tube 16 is stopped in case of 'release' of the product, the compressed air accumulated in the space S flows in a reverse direction. Here, the valve 12 ascends by pressure of the discharged air to close the first tube 16, and then the compressed air is supplied to the second tube 17 through the flow path 14 (refer to arrow ②) and consecutively discharged to the outside through the air-tube 13 (refer to arrow ③), thereby allowing the grip expansion portion 19 to contract.

The above-described structure and action may provide a significant benefit in terms of quick discharge of the compressed air accumulated in the space S and quick release caused by the quick discharge. Reference numeral 26 indicates a discharge passage recessed from a bottom surface of the second tube 17 for preparing a case when the head of the product blocks the end of the second tube 17.

In this embodiment, the valve 12 is a check valve including a skirt 21 disposed at a side of the body 20 and moving by pressure of the compressed air to contact or separated from a side wall of the supply tube 15.

Here, the skirt 21 is contracted and separated by the pressure of the introduced air to open an air path between the first tube 16 and the space S, thereby descending (refer to FIG. 3) in case of the 'gripping'; and, on the contrary, expands and 'contacts' by the pressure of the discharged air to close the air path, thereby naturally ascending (refer to FIG. 5) by the pressure of the discharged air in case of the 'release'.

Also, the first tube 16 is integrated with a central portion of the housing 11, the second tube 17 is separately formed on a fixing bar 23, and the fixing bar 23 is coupled to a lower portion of a body of the first tube 16. Here, the air-tube 13 may be installed by using the fixing bar 23. That is, as illustrated in the drawing, in a state in which an upper flange 24 of the air-tube 13 is inserted between the '⊥'-shaped fixing bar 23 and the first tube 16, the air-tube 13 is compressed by coupling a lower end of the body of the first tube 16 and an upper end of the fixing bar 23 through a screw coupling part 28; or fixed by a bolt 25 that sequentially passes the fixing bar 23—the flange 24—the body of the first tube 16.

The above-described structure is extremely useful in assembly and design of each of the first tube 16, the second tube 17, and the air-tube and is considered as an optimum design in terms of arrangement and installation of the valve 12.

Also, an end-lock 27 that firmly supports the lower end of the air-tube 13 in the form of a U-shape or other shapes may be coupled to a lower portion of the cover part 18, and, in this case, an inner end of the end-lock 27 has a downward-expansion type inclined surface 27 for safe and convenient entry of the target product.

The invention claimed is:

1. A gripper device using an air-tube, comprising:

a gripper housing (11) comprising a supply tube (15) comprising a first tube (16) and a second tube (17), each of which extends in a vertical direction, and a cover part (18) extending downward from an outer side of the supply tube (15);

a valve (12) disposed between the first tube (16) and the second tube (17) in the supply tube (15) to move upward or downwards based on a pressure direction of a compressed air, thereby closing the first tube (16) or the second tube (17);

an air-tube (13), as a cylindrical member spaced apart form an inner wall of the cover part (18) with a space (S) therebetween, which communicates with the second tube (17) and in which a plurality of grip expansion portions (19) are formed on a side wall of the air-tube (13); and a flow path (14) defined at one side of the supply tube (15) to connect the first tube (16) and the space (S) or the space (S) and the second tube (17) based on a movement direction of the valve (13).

2. The gripper device of claim 1, wherein in case of 'gripping' of a product, when said compressed air is supplied through the first tube (16), the valve (12) descends by pressure of the introduced air to close the second tube (17), and the compressed air is supplied to the space (S) between the cover part (18) and the air-tube (13) through the flow path (14) to press the grip expansion portion (19), thereby allowing the grip expansion portion (19) to expand.

3. The gripper device of claim 1, wherein in case of 'release' of a product, when supply of compressed air through the first tube (16) is stopped, the compressed air accumulated in the space (S) flows in a reverse direction, the valve (12) ascends by pressure of the discharged air to close the first tube (16), and the compressed air is supplied to the second tube (17) through the flow path (14) and consecutively discharged to the outside through the air-tube (13), thereby allowing the grip expansion portion (19) to contract.

4. The gripper device of claim 1, wherein the valve (12) is a check valve comprising a skirt (21) disposed at a side portion of a body (20) and moving by pressure of the compressed air to contact or separated from a side wall of the supply tube (15), and the skirt (21) is 'separated' from the side wall of the supply tube (15) to open an air path between the first tube (16) and the space (S) in case of 'gripping' and contacts the side wall of the supply tube (15) to close the air path in case of 'release', thereby allowing the valve (12) to ascend.

5. The gripper device of claim 1, wherein the first tube (16) is integrated with a central portion of the housing (11), the second tube (17) is disposed on a separate fixing bar (23), and the fixing bar (23) is coupled to a lower portion of a body of the first tube (16).

6. The gripper device of claim 5, wherein in a state in which an upper flange (24) is inserted between the fixing bar (23) and the first tube (16), the air-tube (13) is fixed by compression caused by coupling between a lower end of the body of the first tube (16) and an upper end of the fixing bar (23) through a coupling part (28) or by a bolt (25) that sequentially passes trough the fixing bar (23)—the flange (24)—the body of the first tube (16).

7. The gripper device of claim 1, wherein an end-lock (26) that supports a lower end of the air-tube (13) is coupled to a lower portion of the cover part (18).

8. The gripper device of claim 7, wherein an inner end of the end-lock (26) has a downward-expansion type inclined surface (27).

* * * * *